(No Model.)
L. L. RICHMOND.
BICYCLE SADDLE.
No. 502,017. Patented July 25, 1893.
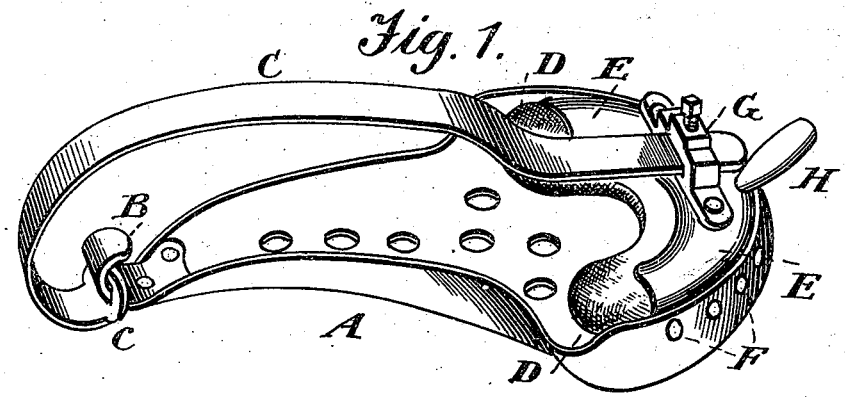
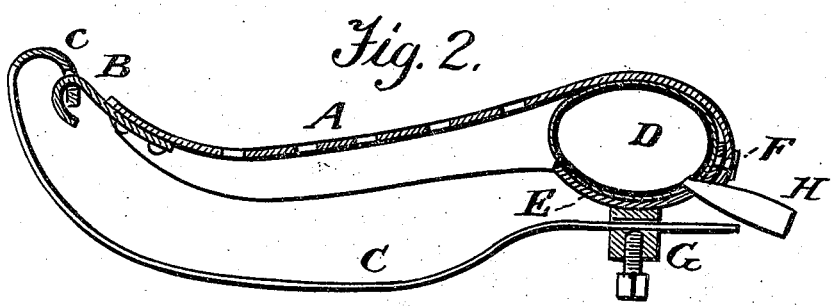
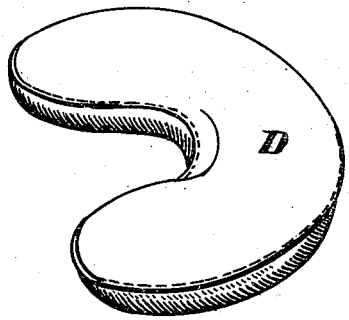
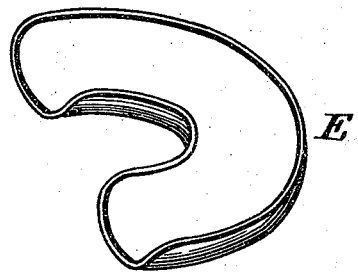
Witnesses.
A. Ruppert.
H. A. Daniels.
Inventor:
Louis L. Richmond,
Per
Thomas P. Simpson
Atty.

UNITED STATES PATENT OFFICE.

LOUIS LAWTON RICHMOND, OF MEADVILLE, PENNSYLVANIA.

BICYCLE-SADDLE.

SPECIFICATION forming part of Letters Patent No. 502,017, dated July 25, 1893.

Application filed April 5, 1893. Serial No. 469,130. (No model.)

*To all whom it may concern:*

Be it known that I, LOUIS LAWTON RICHMOND, a citizen of the United States, residing at Meadville, in the county of Crawford and State of Pennsylvania, have invented certain new and useful Improvements in Bicycle-Saddles; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to cushion the saddle of a bicycle only where the end of the spine and surrounding parts rest and to avoid the heat occasioned by extending a cushion between the legs; also to form an elastic bumper to take the shock of the advancing wheels; also to form a rear brace for the push of the feet against the pedals.

Figure 1 of the drawings is a perspective view of my bicycle saddle turned bottom upward; Fig. 2, a median longitudinal vertical section thereof; Fig. 3 a detail perspective view of the cushion, and Fig. 4 a similar view of the concave plate.

In the drawings, A represents an ordinary leather seat-cloth which is perforated to permit a free circulation of air, is of any preferred size, and has the usual metallic hook B in front. This hook catches in the loop c on the front end of a stiff longitudinal spring C which extends under the saddle from front to rear. This spring C may be held adjustable on the seat-supporting rod of a bicycle in the usual or any preferred way.

D represents the air-cushion which may be made of rubber incased in other material or of any airtight substance. It is made, as shown, nearly in the shape of a semi-circle or may approximate the form of a horseshoe.

E is a metallic plate concaved so as to receive the air-cushion when it has been thoroughly inflated. The rear of the leather seat is drawn over the convexed portion of the plate E and held firmly thereto by flat-headed rivets F, as is also the keeper G in which is adjustably held the rear end of the stiff spring C, to render the leather more or less taut.

H is a rubber tube communicating with the inside of the airbag and passing through the plate E so that the bag may be blown up by an air-pump.

What I claim as new, and desire to protect by Letters Patent, is—

The leather seat with hook in front, the concave plate riveted to the rear of said seat the cushion arranged between the plate and rear of seat, the keeper riveted to the concave plate, and a subjacent plate spring having a loop in front to connect with the hook of the leather seat, the rear of said spring being held adjustably in the keeper, all combined and arranged substantially as shown and described.

In testimony whereof I affix my signature in presence of two witnesses.

LOUIS LAWTON RICHMOND.

Witnesses:
A. B. RICHMOND,
W. S. TROWBRIDGE.